Figure 1:
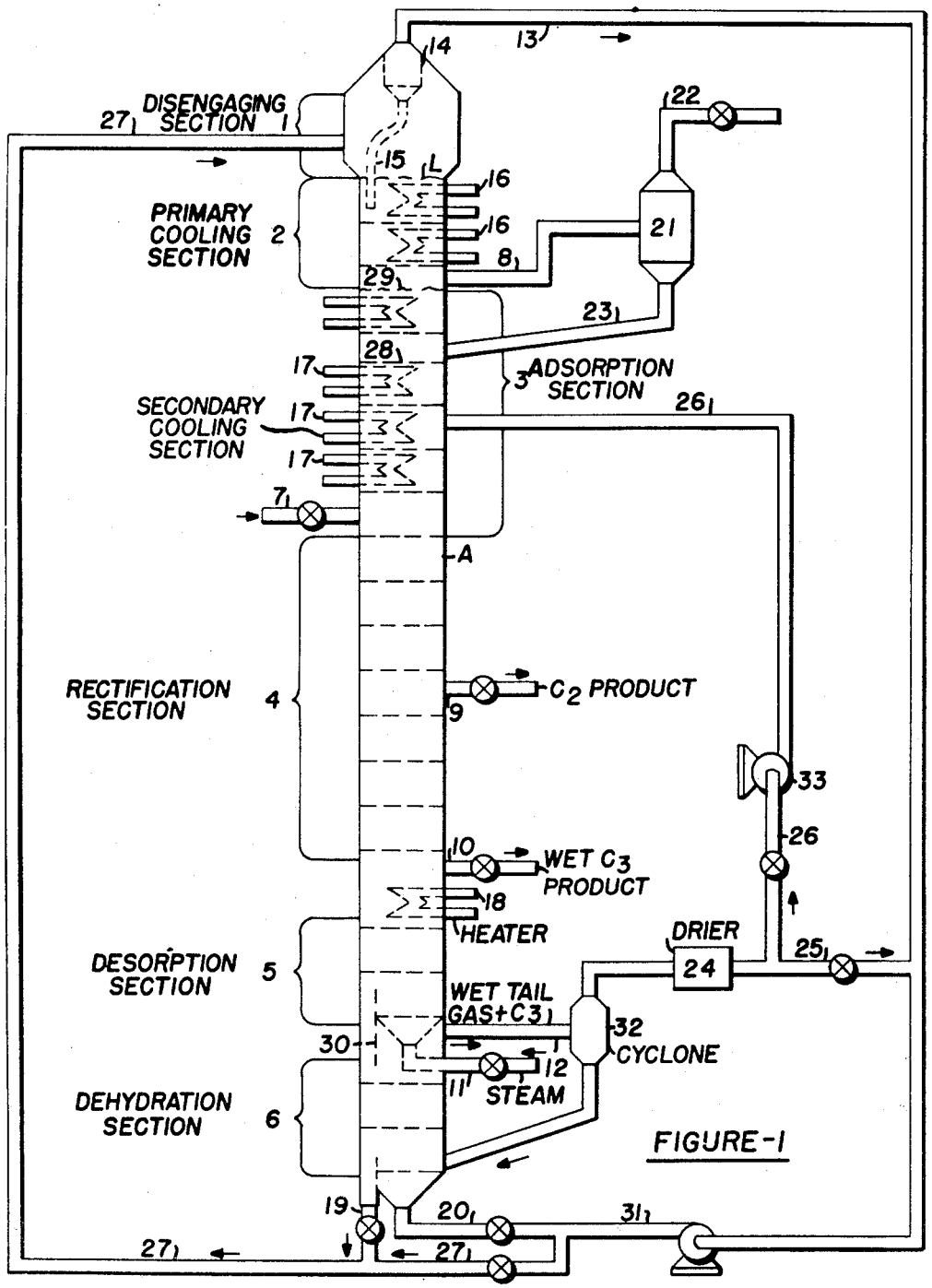

Nov. 8, 1955 R. J. FRITZ ET AL 2,723,000
METHOD FOR ADSORBING, DESORBING, AND DEHYDRATING
ADSORBENT IN FLUID ADSORPTION SYSTEM
Filed Oct. 15, 1953 3 Sheets-Sheet 1

Robert J. Fritz
Lewis D. Etherington   Inventors

By *Henry Berk* Attorney

Robert J. Fritz
Lewis D. Etherington   Inventors

By Henry Berk   Attorney

United States Patent Office 2,723,000
Patented Nov. 8, 1955

2,723,000

METHOD FOR ADSORBING, DESORBING, AND DEHYDRATING ADSORBENT IN FLUID ADSORPTION SYSTEM

Robert J. Fritz, Baton Rouge, La., and Lewis D. Etherington, Cranford, N. J., assignors to Esso Research and Engineering Company, a corporation of Delaware Application October 15, 1953, Serial No. 386,286

18 Claims. (Cl. 183—114.2)

This invention relates to an adsorption process for separating components of a fluid mixture, particularly a mixture of gases, by means of a finely-divided fluidized solid adsorbent in a system involving adsorption, rectification, desorption, and usually adsorbent dehydration and cooling.

It is an object of this invention to reduce the heat transfer load in a fluidized adsorption system. It is an object of this invention to reduce the heat transfer load in a fluidized adsorption system chiefly at the expense of a slight increase in adsorbent circulation rate. Another object is to reduce the required amount of extraneous desorption (stripping) gas such as steam. A further object is to realize minimum contamination of the less adsorbable adsorber product with the most adsorbable components for a given set of desorber design and operating conditions.

It is well known that the cost of an adsorption plant employing fluidized solid adsorbent is largely determined by the large cooling and high temperature heating loads required in the system. According to the process to be outlined, the heat transfer load in the heating and cooling systems are reduced chiefly at the expense of a slight increase in adsorbent circulation rate.

In previously disclosed multistage adsorptive gas separation processes the adsorbent passes successively from a cooling-adsorption zone through a rectification zone to a desorption zone employing stripping steam and then through a dehydration zone, after which the adsorbent repeats this cycle. In these processes, the dehydration zone is at the top of the tower immediately above the cooling-adsorption zone. The adsorbent in the dehydration zone must be comparatively hot, at approximately the same temperature as in the desorption zone, in order to be effectively dehydrated. A gas is used in the dehydrating zone to desorb entrained and adsorbed stripping steam from the adsorbent. Excessive water on the adsorbent would impair its efficiency in the adsorption-rectification zones. The hot adsorbent may be cooled totally in a primary cooling zone, after dehydration and preceding the effective adsorption zone, or the adsorbent may be cooled totally in the effective adsorption zone, or cooled partly in both primary cooling and effective adsorption zones. If a primary cooling zone is used, it is desirable to pass a gas through this zone to enhance the cooling rate for both moving bed and fluidized solids operations. Gradual reduction of the adsorbent temperature in more than one stage is desirable, in order to minimize the cooling surface, when fluidized solids operation is used. This fairly warm adsorbent may be encountered in cooling adsorption zones. The logical gas to use in both the dehydrating and primary cooling zones is the least adsorbable feed fraction, which previously has been disclosed for this purpose and is also used in the process of the present invention.

It is impractical to completely desorb the heavy ends (most adsorbable) feed gas fraction in the desorber. Therefore, at least some of this fraction must necessarily be recycled with the adsorbent through the entire adsorption system. The light feed fraction passed through the hot dehydration section to strip steam, or through hot stages of the cooling adsorption zones, tends also to desorb a portion of the heavy feed fraction which is not stripped from the adsorbent by steam in the desorption zone. Thus, if the net light product is withdrawn from the system at the top of the hot dehydrating zone or from a warm stage in the cooling-adsorption zones, the light product may contain significant amounts of the heaviest feed fraction. The absolute amounts will vary, depending on such factors as severity of desorption conditions and temperature of the adsorbent at the location of net light product withdrawal. For example, as the adsorbent temperature at the stage of light product withdrawal is reduced, the volatility of the adsorbed recycle heavy components will be depressed and contamination of the light product by these components will be reduced. Therefore, for a given specified maximum heavy ends content in the light fraction, the heavy ends recycle on the adsorbent may be increased as the adsorbent temperature in the net light product withdrawal stage is decreased. As the permissible heavy ends recycle increases, the desorption requirements of heating or stripping steam and other requirements such as cooling rapidly decrease. Increased recycle of heavy ends on the adsorbent will require an increased circulation of adsorbent and possibly one or two additional dehydration stages. However, the savings due to decreased desorption and cooling requirements can be order-of-magnitude greater than the increased costs involved in higher adsorbent circulation rates and increased dehydration stages. As the adsorbent temperature in the net light product withdrawal stage is reduced, the advantage gained may be taken in terms of a higher purity light product rather than as decreased desorption and cooling requirements. These principles have not been taught in prior disclosures and will be demonstrated more quantitatively by a sample adsorptive gas separation: the following feed gas is to be separated into $C_1$, $C_2$, and $C_3$ fractions by fluidized adsorbent charcoal at a total pressure of 6 atmospheres.

|  | Feed comp., vol. percent |
|---|---|
| $C_1$ fraction (methane, nitrogen, hydrogen, etc.) | 50 |
| $C_2$ fraction (ethylene and ethane) | 35 |
| $C_3$ fraction (mostly propylene and propane; some butane, etc. | 15 |
|  | 100 |

At desorption conditions of approximately 500° F. char temperature, 50 lbs. stripping steam per 1000 lbs. adsorbent and 6 desorption stages, the residual amount of $C_3$ hydrocarbons on the char after desorption is approximately 20% of that in the feed or 4 pounds per 1000 pounds char. Allowing for lift gas and dehydration cooling effects, the char temperature at the top dehydration stage is approximately 470° F. If the net light product ($C_1$ fraction) is withdrawn at this stage, the loss of valuable $C_3$ hydrocarbons in this fuel fraction is about 5% of the $C_3$ feed. If the desorber char temperature is reduced to 400° F., other desorption conditions remaining the same, the residual amount of $C_3$ on the char after desorption is approximately 12 pounds per 1000 pounds of char, and the top dehydrator stage char drops to about 370° F. Net light product withdrawn at this stage will contain 10–15% of the $C_3$ in the feed. However, if the net light product were withdrawn from a stage at a char temperature of 150 to 175° F., the $C_3$ loss in the $C_1$ fraction would be only 3–5%. Going back to the 500° F. desorber char temperature, withdrawal of the $C_1$ fraction at 150 to 175° F. would lower the $C_3$ content in this fraction to less than 1% of the feed $C_3$. On reducing the desorber temperature from 500 to 400° F. the char circulation must be increased about 5% and two additional dehydrator stages added. However, the heating and cooling loads, much more costly than char circulation and stages, are each reduced 20–30%. It will be observed that the advantages in decreased desorption requirements may be realized partly or all as decreased stripping steam or decreased desorption stages rather than all in terms of reduced char temperatures. The methods of realizing the advantages described above in practical adsorption designs are described in the following.

Recently, L. D. Etherington and R. P. Cahn in Patent No. 2,666,500, issued January 19, 1954, described a process for adsorptive separation of predominantly $C_1$, $C_2$ and $C_3$ hydrocarbons in which the $C_3$ and heavier hydrocarbons were partially desorbed from one fraction of the circulating adsorbent in a desorption zone and more completely desorbed from the remaining fraction of the adsorbent in another desorption zone for the purpose of minimizing desorbing requirements and reducing contamination of lighter hydrocarbons by the heavier hydrocarbons.

This invention has the same object in view but the process is modified as follows, using the adsorptive separation of a $C_1$-$C_2$-$C_3$ hydrocarbon mixture as examples. The heavier fraction of the feed, e. g., $C_3$ hydrocarbons are allowed to build up to an optimum value on the total recirculating adsorbent while at the same time realization of specified light product ($C_1$) purity (or specified maximum $C_3+$ loss in the overhead product) is achieved. The increased recycle of the heavy fraction ($C_3$) on the recycle adsorbent represents decreased desorption requirements at the expense of a slight increase in char circulation. Therefore the optimum recycling of heavy fraction ($C_3$) is the value corresponding to minimum total cost of adsorption tower, adsorbent circulation, cooling and desorption.

The object of increasing the permissible $C_3$ recycle on the circulating adsorbent is attained (1) by decreasing the adsorbent temperature at the stage where the net light product (least adsorbable or $C_1$ fraction) is withdrawn from the adsorber; (2) selection of the optimum relative locations of the various adsorber sections, in particular the relative locations of the more critical dehydration and primary cooling sections; and (3) complete recycle to the adsorber of all least adsorbable feed fraction streams containing excessive quantities of the most adsorbable feed fraction which have been disengaged from the adsorber at high temperature stages in the dehydration and primary cooling zones. This object is realized by the following techniques:

(1) All of the moderately desorbed adsorbent is dehydrated by stripping with recycled tail gas (predominantly the $C_1$ fraction but containing more $C_3$ than the light product) at the bottom of the tower and is cooled in the upper section of the tower in a primary cooling zone between the uppermost disengaging section and the top of the adsorption section proper; meanwhile, net light product is withdrawn not overhead with the tail gas, but from an uppermost cool stage of the adsorption section.

(2) All of the moderately desorbed adsorbent is dehydrated by stripping with recycle tail gas and cooled down to the vicinity of the cooling medium (water) temperature at the bottom of the tower below the desorber before the adsorbent is returned to the adsorption section at the top of the tower; meanwhile, net light product is removed overhead from the disengaging section in the presence of cool dehydrated adsorbent.

Suitable apparatus for use in the process of the invention is shown diagrammatically in the attached drawings. The figures represent in sectional elevational view various types of apparatus adapted to carry out the above described processes.

Figure 2:
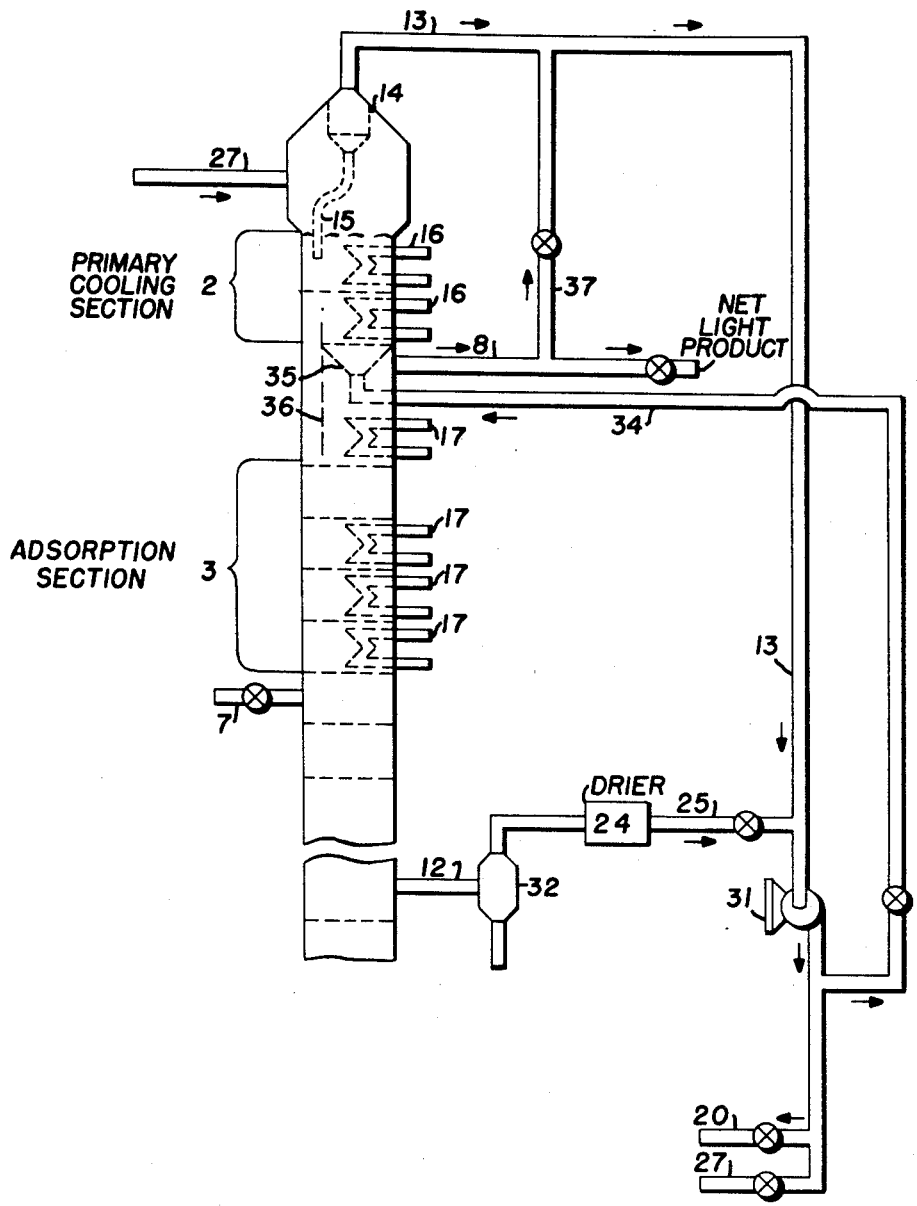

Figure 1 represents a process wherein the adsorbent is dehydrated at the bottom of the tower and cooled in an upper section of the tower above the adsorption section proper. Net light product is removed from the uppermost cooled adsorption stage, distinct from tail gas (containing a higher concentration of heavy components) which is removed overhead from the hot disengaging section and recycled to the tower. Figure 2 represents a modification of the process of Figure 1 in which dry tail gas is returned through the primary cooling zone only as fluidizing gases in those instances where tower gas removed from the adsorption section as light product leaves an inadequate amount of gas passing up the tower to fluidize the adsorbent satisfactorily in the upper primary cooling zone.

Figure 3:
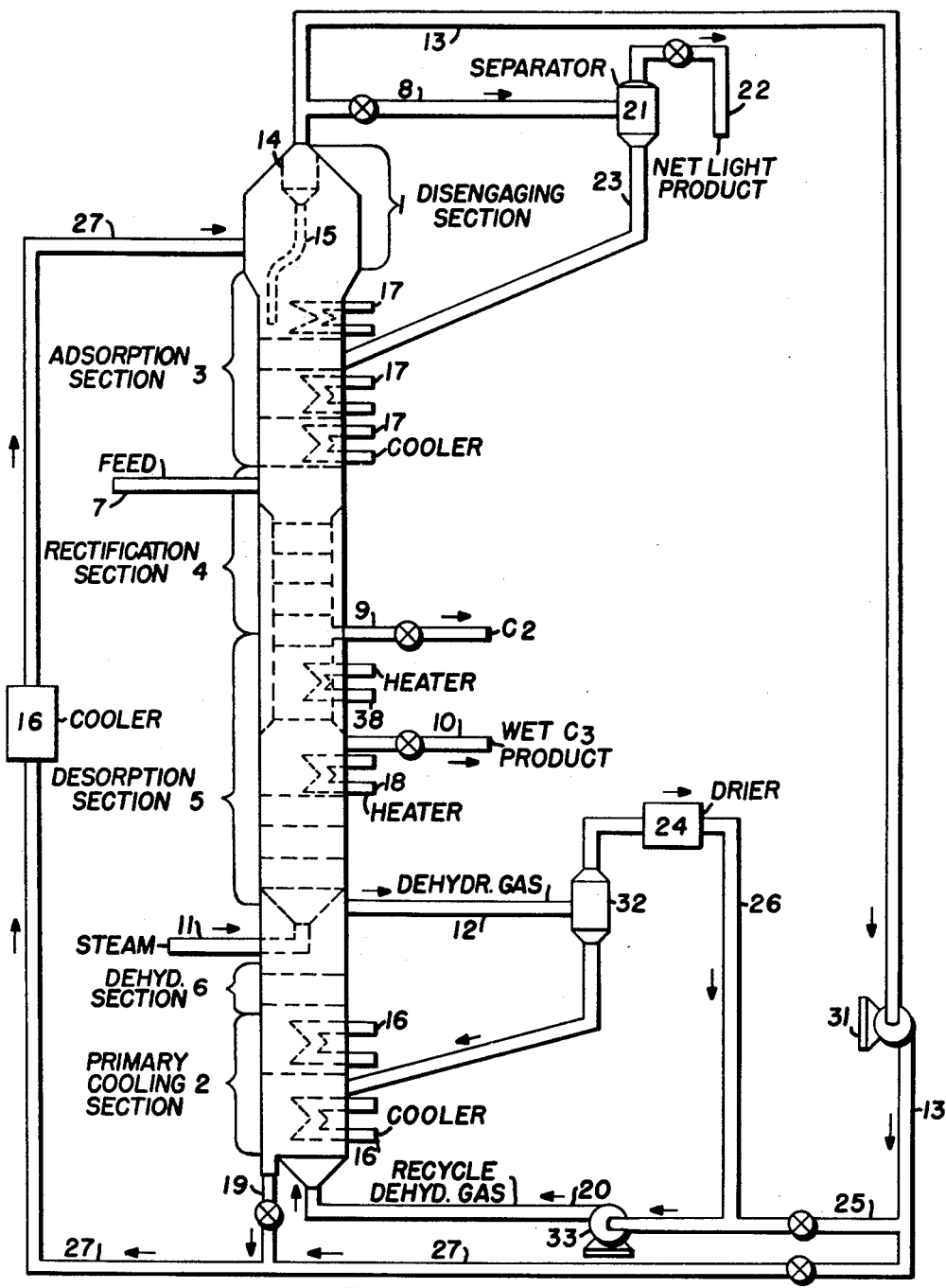

Figure 3 represents the modification wherein both adsorbent dehydration and cooling occur at the bottom of the adsorption tower and net light product is removed overhead from the disengaging zone immediately above the adsorption section.

Referring to Figure 1, the invention will be described for purposes of example only by the separation of $C_1$, $C_2$, and $C_3$ hydrocarbons from a fraction containing a mixture of $C_1$ to $C_3$ and heavier hydrocarbons and less adsorbable gaseous components such as hydrogen and nitrogen by means of adsorption with an activated carbon adsorbent. The letter A represents an adsorption tower having in descending order a disengaging section 1, a primary cooling section 2, an adsorption section 3, a rectification section 4, a desorption section 5, and a dehydration section 6. The disengaging section is provided with pipe 27 for introduction of recirculated carbon adsorbent, a cyclone separator 14 containing dip leg 15 for return of entrained fines to the bed of adsorbent, and a tail gas removal line 13. The primary cooling section is provided with cooling coils 16. Cooling in this section may be accomplished in a single stage or in a number of stages. The adsorption section is provided with a feed line 7, net light product removal line 8, pipe 26 for the return of dry tail gas containing $C_3$ and heavier components, and line 23 for the return of adsorbent from separator 21. The adsorption section is provided with secondary cooling means 17 in order to effect stagewise cooling in said section and to minimize the required char circulation and cooling surface. The rectification section is provided with product removal line 9 for recovery from the tower of a gaseous stream rich in $C_2$ hydrocarbons. The desorption section is provided with product removal line 10 for the recovery from the process of a wet product rich in $C_3$ and heavier hydrocarbons. This section contains a heater 18 in one or more stages and below the heater a steam line 11 for the entrance of steam employed in stripping adsorbed materials from the descending adsorbent. The dehydration section contains a solids removal line in the form of standpipe 19 and a gas line 20 for the entrance of recycle dehydrating gas, e. g., tail gas. The dehydration section also contains gas removal line 12 for the removal therefrom of wet tail gas ($C_1$ fraction) containing an excessive amount of $C_3$ and heavier hydrocarbons.

The feed gas comprising a mixture of methane and lighter gases such as hydrogen, nitrogen, etc., $C_2$ hydrocarbons, $C_3$ hydrocarbons, and small amounts of heavier hydrocarbons such as $C_4$–$C_8$ hydrocarbons are introduced usually under pressure into the adsorption tower A via line 7 to the lowest stage of the adsorption section 3. A mass of finely divided fluidized carbon adsorbent descends the adsorption section from above as will be later explained, and is maintained, by means of cooling coils 17, at a temperature of approximately 120° F. to 175° F. The adsorption tower is provided with equipment to effect the countercurrent contact of ascending gas with descending fluidized adsorbent. Thus the whole tower will preferably contain trays such as indicated by numeral 28 spaced at regular intervals and upon which the carbon will build up due to a weir overflow such as 30 and reach a level indicated by the numeral 29. The adsorbent passes down the tower at such a rate that substantially all of the $C_2$ and heavier hydrocarbons are selectively adsorbed on the carbon within the adsorption section while the methane and lighter components, e. g., hydrogen and nitrogen pass up substantially unadsorbed through the adsorption section and are removed in controlled amounts primarily from the uppermost cooled stage of the adsorption section via line 8. Entrained carbon adsorbent is removed from the light product in separator 21 which may be a filter, or one or more cyclones, etc. Net light product free of entrained carbon is removed from the system via line 22. Carbon fines recovered in separator 21 are returned via line 23 to a lower stage of tthe adsorption section.

The adsorbent passes down the tower into the rectification section 4 below the feed line 7. In the upper part of the rectification section, that is, the section immediately below the feed plate any amounts of methane, hydrogen, or nitrogen which may have remained entrained or adsorbed by the adsorbent as it passes down through the tower are desorbed from the carbon by the reflux action of the more adsorbable, upwardly rising, $C_2$, $C_3$ and heavier hydrocarbon vapors which have been desorbed from the adsorbent at lower points in the tower. The lighter gases pass upwardly through the adsorption section and are eventually withdrawn from the tower via line 8. In the lower area of the rectification section the adsorbent is de-ethanized, that is, $C_2$ hydrocarbons are removed therefrom by means of the refluxing action of the heavier components of the feed, e. g. $C_3$ and heavier hydrocarbons similarly released from the adsorbent in the desorption section. $C_2$ hydrocarbons containing controlled amounts of methane and lighter gases and unavoidable small equilibrium quantities of $C_3$ and heavier gases are removed in controlled amounts as a vapor stream from the rectification section via line 9 at a temperature of approximately 200 to 240° F.

The carbon substantially free of $C_2$ and lighter components passes from the rectification section into desorption section 5. In the desorption section $C_3$ and heavier hydrocarbons are removed from the carbon but not completely. The extent to which the adsorbed heavier components are removed from the adsorbent is controlled by the amount of heat applied by a heater 18 and the amount of stripping steam entering via line 11. The action of the heat together with the countercurrent stripping action of the steam disengages the $C_3$ and heavier hydrocarbons from the adsorbent. The released product passes upwardly and is removed as a wet product stream via line 10 at a temperature of approximately 400° F. Removal of vapor product via lines 9 and 10 is controlled sufficiently to allow a portion of these products to remain in the tower as vapor and pass upwardly through the sections above the point of withdrawal to act as reflux as previously described. In the case of the product removed via line 10, the total wet tower vapor at that point may be removed via line 10 and sent to a dryer for the removal of water therefrom. The dry heavy product gas remaining after removal of the net product portion is returned to the tower as dry reflux. In case wet $C_3$ reflux operation is used, as illustrated, the steam content of the reflux is substantially completely adsorbed in the rectification section below line 9 and subsequently desorbed in the desorption section. Thus, the bulk of the stripping steam leaves the desorption section via line 10 and the small remaining portion leaves with the char at the bottom of the section.

Additional side streams representing one or more intermediate cuts may be obtained by expanding the rectification section 4 and removing in addition to the $C_2$ product therefrom a $C_3$ product, a $C_4$ product, etc. The heaviest fraction being removed from the top section of the desorber, the major component of each additional side stream above the desorber would of course be contaminated chiefly with small equilibrium quantities of heavier product constituents.

In order to carry out the practice of this invention for the separation of $C_1$, $C_2$, and $C_3+$ ($C_3$-and-heavier) hydrocarbons, in which the $C_3+$ product is the heaviest product taken, the desorber is operated at a temperature of approximately 400 to 450° F. rather than at the usual 500 to 550° F. In this manner a considerable portion of the adsorbed $C_3$ and heavier product remains on the carbon as it passes downwardly from the desorption section via standpipe 30 into dehydration section 6. In this section the carbon is contacted countercurrently with a dehydrating gas, e. g., tail gas consisting chiefly of methane and less adsorbable components entering the bottom of the tower via line 20. This gas strips steam from the carbon together with a considerable amount of the remaining adsorbed $C_3$ and heavier hydrocarbons. The dehydrated carbon still containing appreciable amounts of adsorbed heavy hydrocarbons is removed from the dehydration section via standpipe 19 and while still at a temperature of approximately 350 to 400° F. (depending on the dehydration cooling effect) is lifted by means of recycle tail gas via line 27 up to the top of the tower where it enters the hot disengaging section 1. A gaseous stream of tail gas and steam, containing appreciable quantities of $C_3$ and heavier hydrocarbons, is removed from the dehydration section via line 12 at a temperature of about 370 to 400° F. This stream passes through cyclone 32 for fines removal and is then quenched in dryer 24. The nature of equipment used to separate steam and residual fines from streams withdrawn in lines 9, 10, 12, and 22 (such as drier 24), and means of disposing of said steam and fines, have been disclosed previously. The dehydrator gas may desorb a large fraction of the residual adsorbed $C_3$ from the desorption section. It may be undesirable to combine the dehydrator gas from drier 24 with the overhead gas in line 13. For example, depending on the dehydration and lift gas cooling effects, $C_3$ desorbed in the dehydrator may be redeposited on the char in the lift line 27, and result in substantially higher contamination of net light product with $C_3$. In this case, all or a part of the dehydrator gas from drier 24 may be recycled to an intermediate stage of the adsorption section via line 26. The $C_3$ in this gas will be adsorbed before reaching the light product withdrawal stage and will pass downward in the tower. The $C_1$ and lighter components of the gas in line 26 will pass up through the adsorption and primary cooling sections. Without addition of gas in line 26, withdrawal of the net light product may leave an inadequate amount of light gas in the tower for satisfactory char fluidization and heat transfer rates in the primary cooling section. Therefore, the dehydrator gas recycle in line 26 serves the added purpose of better fluidization in section 2. When the recycle in line 26 is not critical from the standpoint of light product purity, it is usually more desirable to combine all the dehydrator gas from drier 24 with the overhead gas in line 13. In this case, required addition of supplementary fluidizing gas in the primary cooling section is preferably effected through the means described in the process of Figure 2.

In the disengaging section the hot char is separated from lift gas which passes through cyclone 14 for removal of fines which are returned to the circulating adsorbent by means of dip leg 15 which extends into the bed of adsorbent in primary cooling section 2 below the level L. Overhead tail gas is removed via line 13 at a temperature of approximately 300 to 350° F. depending on any cooling effects in the lift line and provisions for adsorbent cooling in the top stage. This gas is dry and is pumped to the bottom of the tower by blower 31 to act as dehydrating and lift gas. Meanwhile, the disengaged carbon is cooled in primary cooling section 2 by means of coolant circulating in cooler 16. In this section the temperature of the adsorbent is reduced from slightly below 350° F. to approximately 200° F. The cooled carbon then descends into the adsorption, rectification and desorption sections to effect the separation previously recited. The top stage of the adsorption section from which the net light product is removed is operated at a temperature level of approximately 150 to 157° F., depending on the cooling medium temperature. The bottom stage of the adsorption section is usually operated at about the same temperature level.

Referring to Figure 2, the process operates in the same manner as that described for Figure 1 with the following modifications. At least a portion of the tower gas in addition to the net light product portion passing up the tower through the adsorption section 3 is removed from the system via line 8. At least a portion of the fluidizing gas to fluidize the adsorbent in the primary cooling section 2 is then provided in the following manner. A portion of the dry tail gas pressured by means of blower 31 is introduced via line 34 to the bottom of cone 35. The tail gas will be higher in $C_3$ content than the light product in line 8. The cone serves to prevent contamination of the light product by tail gas. The adsorbent passes via well 36 from the cooling section into the adsorption section. The portion of the total light product in excess of the net product portion removed via line 8 is removed via line 37 and combined with the overhead gas for use as tail gas. In the operation of Figure 2 all of the recycled tail gas streams are pressured by means of the single blower 31. None of the tail gas from the dehydration section via drier 24 is passed to the adsorption section. Thus, blower 33 and line 26 (see Figure 1) are not required in the process of Figure 2.

Referring to Figure 3 the system operates substantially in the same manner as that described in connection with Figure 2 with the following modifications. The primary cooling section 2 is located in the bottom of the tower immediately below the dehydration section 6 so that the adsorbent is cooled substantially to the lowest adsorption temperatures prior to its recycle by means of tail gas to the disengaging section 1. Some of the primary cooling may, if desired, be effected by means of cooler 16 in lift line 27 as shown. Since the disengaging section will then be a cool zone immediately above the adsorption zone, net light product is taken from the total overhead gas stream removed from the system via line 13. The portion of the overhead gases removed as net product is taken from the stream 13 via line 8 and after appropriate removal of residual fines in separator 21 is withdrawn via line 22. The remaining portion of the overhead gas is pressured in blower 31 and recycled as lift gas via line 27, and tower gas via line 25.

The dry recycle gas from drier 24 is pressured in blower 33 and recycled to the bottom of the tower via line 20. The quantity of gas in line 26 is less than that required for tower sections 2 and 6 as provided in line 20. Therefore, supplementary gas is added to blower 33 via line 25 from the overhead gas stream in line 13. As compared to the process of Figure 2, cone 35, line 34 and line 37 are not required. Blower 31 may be used also to pressure gas from drier 24, thus eliminating blower 33, if desired.

In each of the described processes the circulating adsorbent is allowed to contain thereon a quantity of the most readily adsorbable material greater than that normally allowed to remain on the circulating adsorbent between the desorption and adsorption stages. The adsorbent is, however, dehydrated and the net light product is removed from a point in the system where the adsorbent is cool, thus minimizing inclusion of excessive amounts of recycle heavy components with the net light product. In this manner desorption costs which represent a substantial part of the investment in a fluid adsorption system are reduced at the expense of a slight increase in adsorbent circulation rate since capacity of the adsorbent for the key component, e. g., $C_2$ hydrocarbons is slightly reduced due to the presence on the circulating adsorbent of the more readily adsorbed $C_3$ and heavier hydrocarbons.

The present invention is particularly advantageous for separations involving high adsorbent circulations per unit of adsorbed products. The processes described are advantageous in the separation of two component mixtures, namely, separations between methane and $C_2$ hydrocarbons, between hydrogen and methane, between hydrogen and nitrogen, and between nitrogen and methane. In these separations an overhead and a bottoms product only are removed and no product of intermediate adsorbability need be withdrawn from an intermediate stage of the rectification section.

The processes are, of course, particularly adaptable to the separation of $C_1$–$C_2$–$C_3$ etc. hydrocarbons such as those found in residual refinery gas from thermal and catalytic cracking, in ethylene-rich gases from ethane cracking, in dilute ethylene gases from $C_1$–$C_2$ fractionation operations, and to the separation of dilute acetylene gas from Wulff cracking and partial combustion processes. Hydrogen separations from methane, $C_2$ hydrocarbons, nitrogen and carbon monoxide are other examples; more specifically concentration of hydrogen from hydroforming or hydrogenation operations for recycle to the same operation or use in other operations such as hydrofining and ammonia synthesis. Another example is the recovery of solvents such as benzene present in dilute concentrations in an inert carrier gas such as air. The invention is of greater advantage when one or more adsorber sidestreams are taken and the most highly adsorbable feed fraction is present in high concentration on the adsorbent entering the desorption section. The invention makes more practical the susbtitution of recycle bottoms product for steam as stripping gas when extremely sharp separations are not desired. For example, on concentrating the hydrogen in a $H_2$-$C_1$ feed mixture, a portion of the methane withdrawn via line 10 may be pressured and recycled to the bottom of the desorption section as stripping gas instead of steam. The equilibrium quantity of methane adsorbed on the char at the bottom of the desorption section will be recycled with the char to the top adsorber sections. However, the volatility of this adsorbed methane will be depressed due to the low temperature level of the net hydrogen product removal stage, and contamination of hydrogen product due to the methane recycle will be a minimum.

What is claimed is:

1. A process for the separation of gaseous components of a mixture comprising a less readily adsorbed component A and a more readily adsorbed component C by means of adsorption by a solid adsorbent, which comprises passing said adsorbent downwardly through a vertical column having a disengaging section at the top and having beneath said disengaging section a primary cooling section, an adsorption section, a rectification section, a desorption section and a dehydration section; feeding the gaseous mixture to a lower portion of the adsorption section, removing a gaseous stream of component A substantially free of component C from an upper portion of the adsorption section, applying heat and the action of stripping steam to the adsorbent in the desorption section to an extent sufficient to cause incomplete vaporization of adsorbed component C from the adsorbent, removing a gaseous stream of component C and stripping steam from the desorption section, contacting adsorbent which contains remaining adsorbed component C and steam in the dehydration section countercurrently with tail gas comprising component A and component C, removing a wet stream containing component A and component C from an upper portion of the dehydration section, removing a hot stream of adsorbent from the lowermost section of the column and conveying it by the lifting action of tail gas into the disengaging section at the top of the column for passage downwardly through said column, and removing disengaged gases containing components A and C as tail gas from the disengaging section.

2. A process according to claim 1 in which the mixture is a mixture of hydrogen and methane in which hydrogen is the less readily adsorbed component and methane is the more readily adsorbed component and in which the adsorbent is activated carbon.

3. A process according to claim 1 in which the adsorption section is provided with secondary cooling means.

4. A process for the separation of gaseous components of a mixture comprising a less readily adsorbed component A, and a more readily adsorbed component C by means of adsorption by a solid adsorbent which comprises passing said adsorbent continuously downwardly through a zone having in descending order, above the gaseous mixture feed-point thereto, a disengaging section and an adsorption section, and having successively, below said gaseous mixture feed point, a rectification section, desorption section, dehydration section and a primary cooling section; feeding the gaseous mixture to a lower portion of the adsorption section, removing a gaseous stream of component A substantially free of component C from an upper portion of the disengaging section, applying heat and the stripping action of steam to the adsorbent in the desorption zone to an extent sufficient to cause incomplete vaporization of adsorbed component C from the adsorbent, removing a gaseous stream of component C and steam from the desorption section, contacting hot adsorbent containing adsorbed component C and steam in the dehydration section countercurrently with a portion of the said removed stream of component A as dehydrating gas introduced thereto through said primary cooling section, removing a wet stream containing component C and component A from an upper portion of said dehydration section, passing the dry hot adsorbent from the dehydration section through the primary cooling section wherein the adsorbent is cooled substantially to adsorption temperature, removing a stream of dry cooled adsorbent containing residual adsorbed component C from the primary cooling section and conveying it by the lifting action of a portion of said removed stream of component A to the disengaging zone and repeating the cycle.

5. A process according to claim 4 in which the mixture is a mixture of hydrogen and methane in which hydrogen is the less readily adsorbed component and methane is the more readily adsorbed component and in which the adsorbent is activated carbon.

6. A process according to claim 4 in which the adsorption section is provided with secondary cooling means.

7. A process according to claim 4 in which the wet stream removed from said dehydration section and containing components A and C is dried to produce a dry tail gas, and the resulting dry tail gas stream containing components A and C is introduced into the bottom of the primary cooling section as part of the fluidizing gas for the descending adsorbent.

8. A process for the separation of gaseous components of a mixture comprising a less readily adsorbed component A, a more readily adsorbed component C, and an intermediate component B by means of adsorption by a solid adsorbent which comprises passing said adsorbent continuously downwardly through a zone having in descending order above the gaseous mixture feed-point thereto, a disengaging section, a primary cooling section and an adsorption section, and having successively, below said gaseous mixture feed-point, a rectification section, a desorption section and a dehydration section; feeding the gaseous mixture to a lower portion of the adsorption section, removing a gaseous stream of component A substantially free of component C from an upper portion of the adsorption section, removing a gaseous stream of component B from said rectification section, applying heat and the action of stripping steam to the adsorbent in the desorption zone to an extent sufficient to cause incomplete vaporization of adsorbed component C from the adsorbent, removing a gaseous stream of component C and steam from the desorption section, contacting adsorbent containing adsorbed component C and steam in the dehydration section countercurrently with tail gas comprising component A and component C, removing a wet stream containing component C and component A from an upper portion of the dehydration section, removing a dry, hot stream of adsorbent from the dehydration section and conveying it by the lifting action of recycled tail gas into the disengaging section, removing disengaged gases containing components A and C as tail gas from the disengaging zone, flowing the hot adsorbent through said primary cooling section and therefrom into said adsorption section.

9. A process according to claim 8 in which the primary cooling, adsorption, rectification, desorption and dehydration sections are staged.

10. A process according to claim 8 in which the adsorbent is activated carbon.

11. A process according to claim 8 in which the wet stream containing components A and C is dried and a portion of the resulting dried stream is introduced into an intermediate stage of the adsorption section wherein component C is adsorbed therefrom by the descending adsorbent.

12. A process according to claim 8 in which the descending adsorbent is finely-divided and fluidized by means of ascending gases.

13. A process according to claim 11 in which a portion of the dry stream containing component A and C is added to tail gas and recycled to the dehydration section.

14. A process according to claim 8 in which the gaseous mixture contains saturated and unsaturated hydrocarbons of the aliphatic series together with inert gases less adsorbable than $CH_4$, and in which component A represents $CH_4$ and inert gases, component B represents $C_2$ hydrocarbons and in which component C represents $C_3$ and heavier hydrocarbons.

15. A process according to claim 8 in which the adsorption section is provided with secondary cooling means.

16. A process for the separation of gaseous components of a mixture comprising a less readily adsorbed component A, a more readily adsorbed component C, and an intermediate component B by means of adsorption by a solid adsorbent which comprises passing said adsorbent continuously downwardly through a zone having in descending order, above the gaseous mixture feed-point thereto, a disengaging section and an adsorption section, and having successively, below said gaseous mixture feed point, a rectification section, desorption section, dehydration section and a primary cooling section; feeding the gaseous mixture to a lower portion of the adsorption section, removing a gaseous stream of component A substantially free of component C from an upper portion of the disengaging section, removing a gaseous stream of component B from the rectification section, applying heat and the stripping action of steam to the adsorbent in the desorption zone to an extent sufficient to cause incomplete vaporization of adsorbed component C from the adsorbent, removing a gaseous stream of component C and steam from the desorption section, contacting hot adsorbent containing adsorbed component C and steam in the dehydration section countercurrently with a portion of the said removed stream of component A as dehydrating gas introduced thereto through said primary cooling section, removing a wet stream containing component C and component A from an upper portion of said dehydration section, passing the dry hot adsorbent from the dehydration section through the primary cooling section wherein the adsorbent is cooled substantially to adsorption temperature, removing a stream of dry cooled adsorbent containing residual adsorbed component C from the primary cooling section and conveying it by the lifting action of a portion of said removed stream of component A to the disengaging zone and repeating the cycle.

17. A process according to claim 16 in which the wet stream from the dehydration section is dried and a portion of the dry gas is introduced into the primary cooling and dehydration sections together with said removed stream of component A as solids fluidizing and dehydrating gas.

18. A process according to claim 16 in which the adsorption section is provided with secondary cooling means.

References Cited in the file of this patent

UNITED STATES PATENTS

| | | |
|---|---|---|
| 2,575,519 | Imhoff et al. | Nov. 20, 1951 |
| 2,583,352 | Berg | Jan. 22, 1952 |
| 2,590,322 | Imhoff et al. | Mar. 25, 1952 |
| 2,609,887 | Berg | Sept. 9, 1952 |
| 2,616,515 | Berg | Nov. 4, 1952 |
| 2,630,876 | Kehde | Mar. 10, 1953 |
| 2,630,877 | Berg | Mar. 10, 1953 |
| 2,666,500 | Cahn et al. | Jan. 19, 1954 |
| 2,702,826 | Kirshenbaum | Feb. 22, 1955 |